United States Patent [19]
Schubert

[11] Patent Number: 5,949,596
[45] Date of Patent: Sep. 7, 1999

[54] EXTERIOR REAR VIEW MIRROR WITH CABLE PULL ADJUSTMENT

[75] Inventor: Jan Schubert, Wedemark, Germany

[73] Assignee: Bernhard Mittelhäuser, Wedemark, Germany

[21] Appl. No.: 09/126,017

[22] Filed: Jul. 29, 1998

[30] Foreign Application Priority Data

Jul. 29, 1997 [DE] Germany ............................ 197 32 491

[51] Int. Cl.⁶ .............................. G02B 7/182; F16C 1/10; B60R 1/06
[52] U.S. Cl. ............................ 359/872; 359/875; 74/502.1
[58] Field of Search .................................. 359/872, 875, 359/876; 74/500.5, 501.5 R, 501.6, 502.1

[56] References Cited

U.S. PATENT DOCUMENTS

| | | | |
|---|---|---|---|
| 2,931,245 | 4/1960 | Jacobson | 74/502.1 |
| 3,183,736 | 5/1965 | Jacobson . | |
| 3,195,370 | 7/1965 | Smith | 74/502.1 |
| 3,247,722 | 4/1966 | Jacobson | 74/502.1 |
| 3,253,481 | 5/1966 | Warhol | 74/502.1 |
| 3,286,545 | 11/1966 | Malachowski | 74/502.1 |
| 3,369,427 | 2/1968 | Brighton et al. | 74/502.1 |
| 3,712,149 | 1/1973 | Van Noord | 74/502.1 |
| 4,103,560 | 8/1978 | Stoffel et al. | 74/502.1 |
| 4,640,142 | 2/1987 | Cummins et al. | 359/872 |
| 5,737,972 | 4/1998 | Jenssen et al. | 74/502.1 |

FOREIGN PATENT DOCUMENTS

| | | | |
|---|---|---|---|
| 2715335 | 10/1978 | Germany | 74/502.1 |
| 1952699 | 1/1997 | Germany . | |
| 1401779 | 7/1975 | United Kingdom | 74/502.1 |

*Primary Examiner*—Ricky D. Shafer
*Attorney, Agent, or Firm*—Robert W. Becker & Associates

[57] ABSTRACT

An exterior rear view mirror for a motor vehicle has a housing with a pivotable mirror pane. A first and a second cable pull having first ends are connected to the mirror pane. The cable pulls act on the mirror pane in a same direction to pivot the mirror pane about a first mirror axis and act on the mirror pane in opposite directions to pivot the mirror pane about a second mirror axis extending perpendicular to the first axis. The cable pulls have second ends connected to opposite ends of a transverse member. A ball joint is connected to the housing. An actuating lever is connected to the ball joint and is accessible from the interior of the vehicle for actuating the ball joint. An arm connects the transverse member to the ball joint and extends at an angle to the actuating lever. A guide for guiding the arm is provided in which the arm is moved back and forth when the actuating lever is moved in a first direction of movement, causing the transverse member to move perpendicularly to its longitudinal axis and moving the cable pulls in the same direction. The arm is rotated about its longitudinal axis when the actuating lever is moved in a second direction of movement, causing the transverse member to rotate about an axis perpendicular to its longitudinal axis and moving the cable pulls in opposite directions.

11 Claims, 3 Drawing Sheets

EXTERIOR REAR VIEW MIRROR WITH CABLE PULL ADJUSTMENT

BACKGROUND OF THE INVENTION

The present invention relates to an exterior rear view mirror with cable pull adjustment whereby two cable pulls are provided which can be moved either in opposite directions or in the same direction in order to adjust the mirror body about a vertical axis or about a horizontal axis, i.e., two axes positioned at a right angle to one another. The invention relates to such mirrors in which the actuating lever is connected to a ball joint having a ball that is connected by an arm to a transverse member having connected thereto spaced-apart fastening locations for the two cable pulls.

In known mirrors of this kind, as disclosed, for example, in German Patent Application 195 26 991, the actuating lever acts on the ball on a side facing the interior of the vehicle while the arm of the transverse member is positioned at the opposite side of the ball joint. Such a construction has the disadvantage that the ball joint together with the aforementioned elements requires a relatively large mounting and space or depth which, however, can not be provided in all cases, for example, when the socket of the mirror housing for housing the ball joint is to be embodied relatively flat. Furthermore, this known embodiment has the disadvantage that for pivoting of the mirror pane about an axis, the actuating lever must be rotated.

These disadvantages are to be avoided with the present invention. Accordingly, it is an object of the present invention to provide a mirror of the aforementioned kind having an adjusting mechanism requiring only a minimal mounting depth and requiring, for the adjustment of the mirror pane, only pivoting or tilting movements of the actuating lever.

SUMMARY OF THE INVENTION

As a solution to this object it is suggested according to the present invention that the arm positioned at an angle to the actuating lever is moveable in a guide when pivoting the actuating lever, so that the transverse member is moved linearly for performing a movement of both cable pulls in the same direction, i.e., transverse to the longitudinal direction of the transverse member. When pivoting the actuating lever in a different direction, the actuating lever rotates the arm about its longitudinal axis so that the transverse member is rotated for movement of the cable pulls in opposite directions. Accordingly, the arm no longer is positioned substantially on an extension of the actuating lever but instead is positioned practically at a right angle thereto and thus requires only a minimal mounting depth. The socket of the mirror housing can be very flat and narrow and can be positioned closely to the vehicle skin. It is especially expedient in this context when the arm is guided in a slot or slotted hole of an angle piece, respectively, a leg of the angle piece provided with a slot or slotted hole. A further leg that is connected to the ball joint and, optionally, is a component of the ball joint.

BRIEF DESCRIPTION OF THE DRAWINGS

The object and advantages of the present invention will appear more clearly from the following specification in conjunction with the accompanying drawings, in which.

DESCRIPTION OF THE PREFERRED EMBODIMENTS

Figure 1:
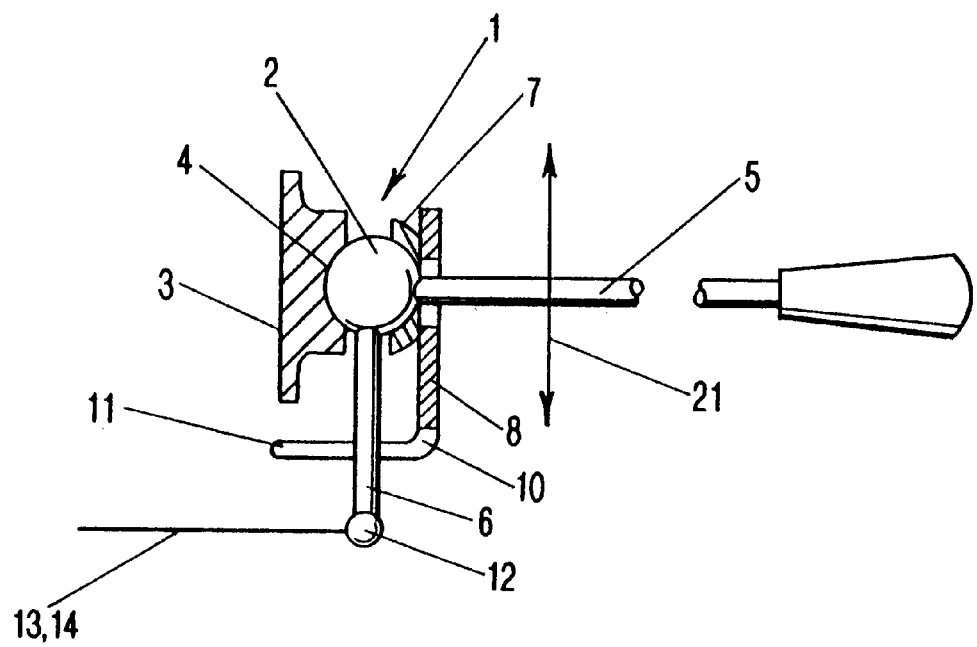
FIG. 1 shows a vertical part-sectional view of the socket of the mirror housing of an exterior rear view mirror connected to a vehicle, whereby the sectional view shows in particular the actuating lever and the ball joint.
Figure 2:
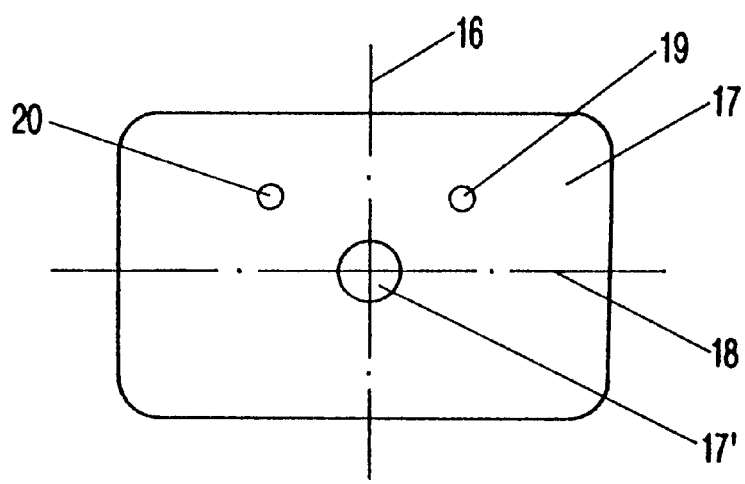
FIG. 2 shows the mirror pane in a view from the rear.
Figure 3:
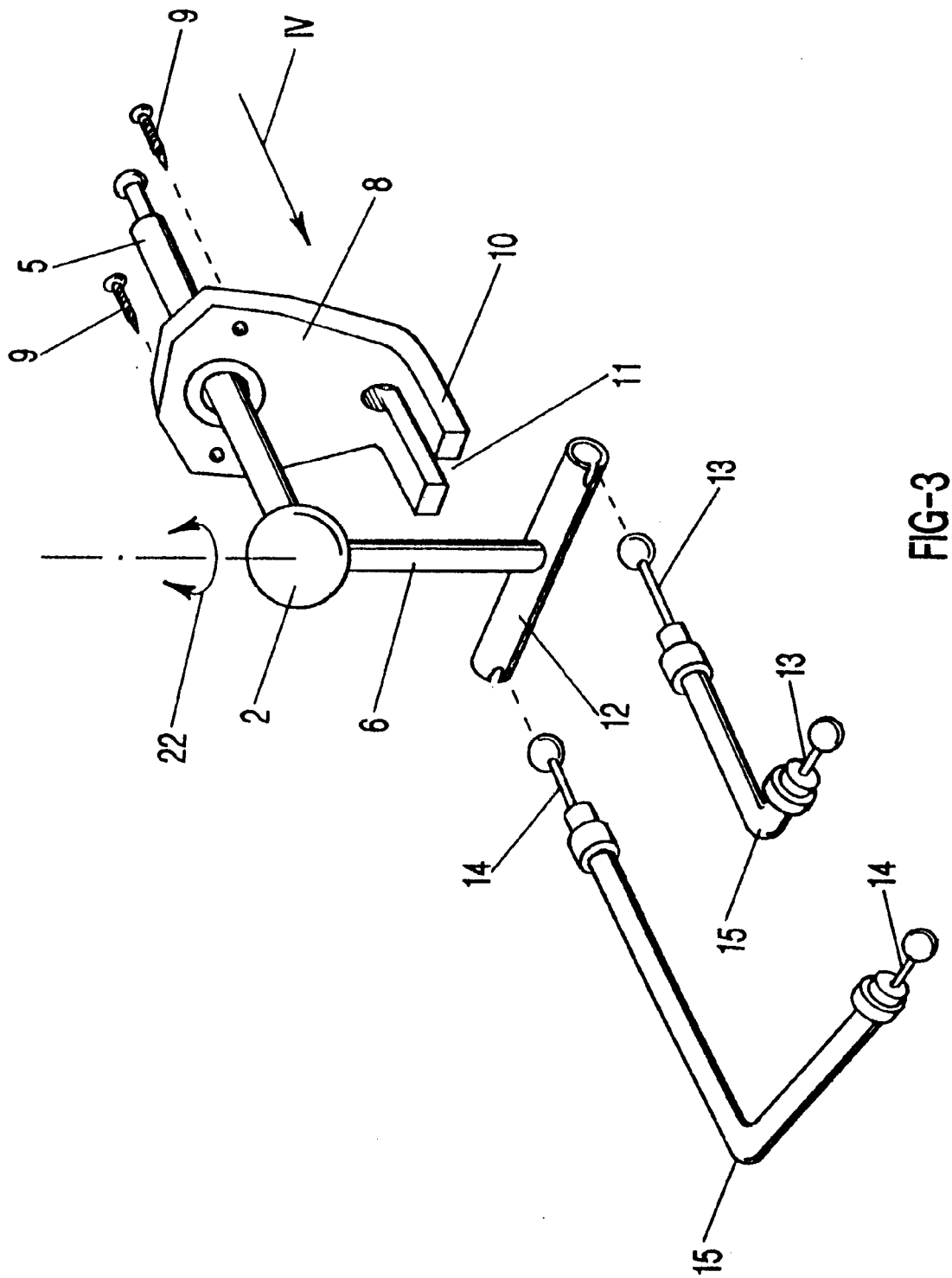
FIG. 3 is an exploded perspective view of the ball joint area facing away from the actuating lever.
Figure 4:
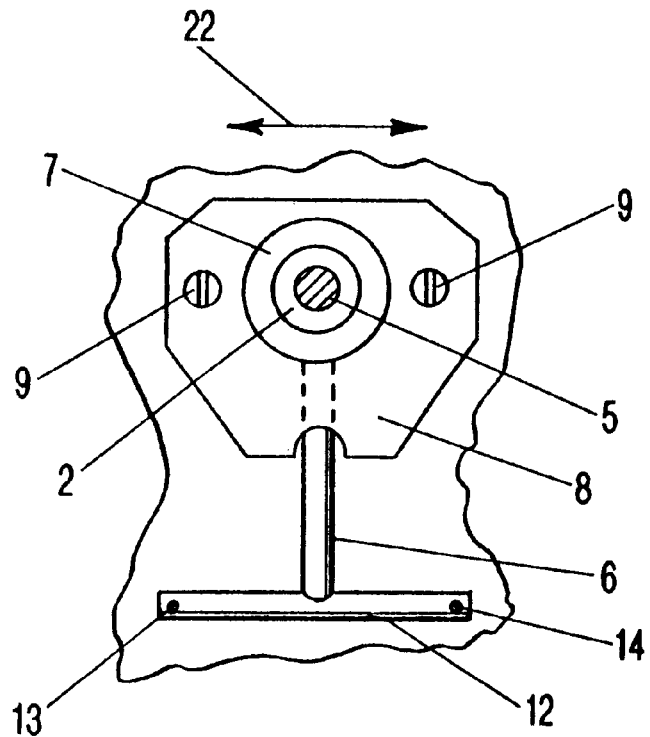
FIG. 4 is a part-sectional view in the direction of arrow IV of FIG. 3.
Figure 5:
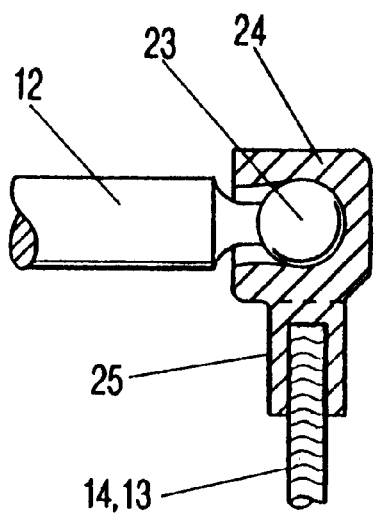
FIG. 5 shows a fastening location for a cable pull at one end of the transverse member in a sectional view.

The present invention will now be described in detail with the aid of several specific embodiments utilizing FIGS. 1 through 5.

The component of the ball joint 1 with ball 2 facing away from the vehicle is provided by wall 3 of the socket of the mirror housing and the holder provided thereat for the ball 2 is indicated with reference numeral 4. An actuating lever 5 which is substantially horizontally arranged and projects into the interior of the vehicle is connected to the ball 2. At a right angle to the actuating lever 5, a substantially vertically extending arm 6 is provided that extends from the ball 2 in the downward direction. An outer disk 7 acting on the ball 2 is provided. The ball 2 is secured by the disk 7 in cooperation with the vertical leg of the angle piece 8 with the aid of two screws 9 at the wall 3 of the housing to thereby form the ball joint 1.

The substantially horizontally extending leg 10 of the angle piece 8 is fork-shaped and has a slot 11 that extends horizontally outwardly (relative to the vehicle) toward the interior of the mirror housing. The arm 6 is guided in this slot 11 below the ball joint 1.

At the lower end of the arm 6 a horizontally extending transverse member 12 is connected that is positioned at a right angle to the arm 6 and to the actuating lever 5. At the opposite ends of the transverse member 12 cables 13, 14 of the cable pulls are provided which are secured without play in non-displaceably supported flexible sleeves 15 so as to form a Bowden cable. They are embodied so as to be pull-resistant as well as pressure-resistant in the longitudinal direction. The two cables 13, 14 engage pivotably the mirror pane 17 on opposite sides of a (vertical) transverse axis 16 and are positioned at the same spacing relative to the horizontal (transverse) axis 18 and the vertical axis 16. The two points of engagement for the cables 13, 14 at the back side of the mirror pane 17 are indicated with reference numerals 20, 19, and the ball joint required for adjusting the position of the mirror pane 17 is indicated with reference numeral 17'. This ball joint 17' is centrally arranged on the mirror pane 17.

With respect to manipulation and function of the inventive mirror it should be noted that a pivoting of the actuating lever 5 in the direction of double arrow 21 (upwardly and downwardly) results in a movement of the arm 6 within the slot 11. Accordingly, the transverse member 12 also performs a corresponding movement to the front or to the rear. Thus, the two cables 13, 14 are synchronously moved in the same direction so that the mirror pane 17 is pivoted about the transverse (horizontal) axis 18.

When the actuating lever 5 is moved horizontally in the direction of double arrow 22, a corresponding rotation of the arm 6 and thus a rotation of the transverse member 12 takes place. Accordingly, the cables 13, 14 are moved in opposite directions. This results in a movement of the mirror pane 17 about the vertical (transverse) axis 16.

It is thus possible to adjust the mirror by simply pivoting the actuating lever 5 laterally (from side to side) or upwardly and downwardly with only two cables 13, 14 without requiring a return spring, etc. for the mirror pane 17.

It should be noted that optionally the disk 7 can be eliminated. In this design the vertical leg of the angle piece 8 must be embodied accordingly, i.e., the edges of the hole within the vertical leg must have rounded portions in order to provide abutments for the ball 2. It is furthermore important that the mirror adjustment can be realized without a return spring so that exclusively the two cables 13, 14 provide adjustment.

In order to provide for a permanent and safe attachment of the cables 13, 14 to the ends of the transverse member 12, i.e., an attachment that allows for pivoting between the transverse member 12 and the cables 13, 14, the opposite ends of the transverse member 12 are provided with a spherical portion (ball) 23 engaged by a socket 24 having arranged thereat a sleeve projection 25 which is fixedly attached to the cable ends of the cable 13, 14. The parts 24, 25 are formed as a unitary (monolithic) shaped body of a relatively hard plastic material that is slightly elastic and deformable. The opening of the socket 24 is designed such that the socket 24 can be mounted on the ball 23 by slight widening of its opening (snap-on mounting) and is safely secured in the position according to FIG. 5 on the ball 23 without requiring any additional securing means. In this manner a jointed connection in the manner of a ball joint is provided.

The specification incorporates by reference the disclosure of German priority document 197 32 491.6 of Jul. 29, 1997.

The present invention is, of course, in no way restricted to the specific disclosure of the specification and drawings, but also encompasses any modifications within the scope of the appended claims.

What is claimed is:

1. An exterior rearview mirror for a motor vehicle, said mirror comprising:

a housing (3) having a mirror pane (17) pivotably connected in said housing (3);

first and second cable pulls (13, 14, 15) having first ends 19', 20' connected to said mirror pane (17);

said first and second cable pulls (13, 14, 15) acting on said mirror pane (17) in a same direction to pivot said mirror pane (17) about a first mirror axis (18) and acting on said mirror pane (17) in opposite directions to pivot said mirror pane (17) about a second mirror axis (19) extending perpendicular to said first axis (18);

said first and second cable pulls (13, 14, 15) having second ends (13a, 14a);

a transverse member (12);

said second ends (13a, 14a) of said first and second cable pulls (13, 14, 15) connected to opposite ends of said transverse member (12);

a ball joint (2, 4, 7) connected to said housing (3);

an actuating lever (5) connected to said ball joint (2, 4, 7) and accessible from an interior of the vehicle for actuating said ball joint (2, 4, 7);

an arm (6) connected to said transverse member (12) and said ball joint (2, 4, 7) and extending at an angle to said actuating lever (5);

a guide (11) for guiding said arm (6);

wherein said arm (6) is moved back and forth in said guide (11) when said actuating lever (5) is moved in a first direction of movement, causing said transverse member (12) to move perpendicularly to a longitudinal axis of said transverse member (12) and moving said cable pulls (13, 14, 15) in said same direction;

wherein said arm (6) is rotated about a longitudinal axis of said arm (6) when said actuating lever (5) is moved in a second direction of movement, causing said transverse member (12) to rotate about an axis perpendicular to said longitudinal axis of said transverse member (12) and moving said cable pulls (13, 14, 15) in said opposite directions.

2. A mirror according to claim 1, wherein said arm (6) extends downwardly from said ball joint (2, 4, 7).

3. A mirror according to claim 2, wherein said arm (6) extends vertically downwardly from said ball joint (2, 4, 7).

4. A mirror according to claim 2, wherein said transverse member (12) is connected to a lower end of said arm (6) and is positioned at an angle of 90° to said arm (6).

5. A mirror according to claim 1, further comprising an angle piece (8) having a first leg and a second leg (10), wherein said first leg is connected to said ball joint (2, 4, 7) and said housing (3), wherein said guide (11) is located in said second leg (10).

6. A mirror according to claim 5, wherein said guide (11) is a slot in said second leg and wherein said slot (11) opens at a free end of said second leg (10).

7. A mirror according to claim 5, wherein said guide (11) extends horizontally.

8. A mirror according to claim 5, wherein said guide (11) extends parallel to said actuating lever (5).

9. A mirror according to claim 5, further comprising fastening elements (9), wherein said first leg covers one side of said ball joint (2, 4, 7) and wherein said fastening elements (9) fasten said first leg and said ball joint (2, 4, 7) to said housing (3).

10. A mirror according to claim 9, wherein said angle piece (8) is a part of said ball joint (2, 4, 7) and has a receiving element in which a ball (2) of said ball joint (2, 4, 7) is received.

11. A mirror according to claim 1, wherein said opposite ends (23) of said transverse member (12) are spherical elements and wherein said second ends of said cable pulls (13, 14) have a socket member (24, 25) including a socket 24 and a sleeve projection (25), wherein said spherical elements (23) are positioned in the sockets (24), and wherein the sleeve projections (25) securely enclose a cable end of said cable pulls (13, 14, 15).

* * * * *